United States Patent
Larsen et al.

(10) Patent No.: US 7,466,109 B1
(45) Date of Patent: Dec. 16, 2008

(54) SYSTEMS AND METHODS INVOLVING VARIABLE SPEED GENERATORS

(75) Inventors: Einar Vaughn Larsen, Charlton, NY (US); James Michael Fogarty, Schenectady, NY (US); Cyrus David Harbourt, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/098,585

(22) Filed: Apr. 7, 2008

(51) Int. Cl.
*H02P 9/44* (2006.01)
(52) U.S. Cl. .............................. 322/59; 322/29; 322/37; 322/46
(58) Field of Classification Search .................. 322/59, 322/29, 37, 46
See application file for complete search history.

(56) References Cited

U.S. PATENT DOCUMENTS

| | | | |
|---|---|---|---|
| 6,486,640 B2 | 11/2002 | Adams | |
| 7,301,311 B2* | 11/2007 | Xu et al. | 322/59 |
| 7,332,894 B2* | 2/2008 | Ichinose et al. | 322/29 |

\* cited by examiner

*Primary Examiner*—Nicholas Ponomarenko
*Assistant Examiner*—Iraj A Mohandesi
(74) *Attorney, Agent, or Firm*—Cantor Colburn LLP

(57) ABSTRACT

An electrical generation system comprising a generator. The generator including, a stator portion, and a rotor portion, and a variable frequency generator (VFG) exciter. The VFG exciter including, a first converter, operative to convert DC current to AC current connected to a DC link and a second converter, operative to convert DC current to AC current connected to the DC link. The system including a first switch operative, when closed, to connect the first converter to the stator portion while the generator is operating in a starting condition, wherein the first switch is open while the generator is operating in a running condition. The system including second switch operative, when closed, to connect the first converter and the second converter in parallel to the rotor portion while the generator is operating in a running condition, wherein the second switch is open while the generator is operating in the starting condition.

14 Claims, 3 Drawing Sheets

SYSTEMS AND METHODS INVOLVING VARIABLE SPEED GENERATORS

BACKGROUND OF THE INVENTION

Embodiments of the invention relate generally to electrical power generators, and more particularly to starting and running variable speed electrical power generators.

In this regard, synchronous generator systems generally operate at a set speed that yields a steady output frequency that matches a power grid, for example, 50 Hz and 60 Hz. If the electrical load on the grid increases beyond the generation capacity of the grid, there may be a resultant slowing of the generators that may reduce the frequency on the grid. If the load decreases resulting in an excess of generation capacity, the generators may accelerate and the grid frequency increases.

Thus, it is desirable to use a cost effective system and method that assists in limiting the slowing of generators on a grid if the grid load threatens to surpass the generation capacity of the grid.

BRIEF DESCRIPTION OF THE INVENTION

An exemplary embodiment of the present invention includes an exemplary electrical generation system comprising a generator, wherein the generator includes, a stator portion, and a rotor portion, a variable frequency generator (VFG) exciter, wherein the VFG exciter includes, a first converter, operative to convert DC current to AC current connected to a DC link and a second converter, operative to convert DC current to AC current connected to the DC link, a first switch operative, when closed, to connect the first converter to the stator portion while the generator is operating in a starting condition, wherein the first switch is open while the generator is operating in a running condition and a second switch operative, when closed, to connect the first converter and the second converter in parallel, to the rotor portion while the generator is operating in a running condition, wherein the second switch is open while the generator is operating in the starting condition.

An alternate exemplary embodiment of the present invention includes A variable frequency generator (VFG) exciter comprising, a first converter, operative to convert DC current to AC current connected to a DC link, and a second converter, operative to convert DC current to AC current connected to the DC link, wherein the second converter is electrically connected to a generator rotor, a first switch operative, when closed, to connect the first converter to a stator portion while a generator is operating in a starting condition, wherein the first switch is open while the generator is operating in a running condition, and a second switch operative, when closed, to connect the first converter and the second converter in parallel, to the rotor portion while the generator is operating in a running condition, wherein the second switch is open while the generator is operating in the starting condition.

An exemplary embodiment of the present invention includes A method for starting and operating a VFG system, the method comprising, closing a first switch, wherein the closed first switch is operative to connect a first converter to a stator of a generator, starting the first converter, wherein the first converter is operative to convert DC power to AC power and control the stator, starting a second converter, wherein the second converter is electrically connected to a rotor, and is operative to convert DC power to AC power and control the rotor, starting a generator, opening the first switch, thereby disconnecting the first converter from the stator, closing a second switch, wherein closing the second switch connects the first converter and the second converter in parallel, and controlling the first converter and the second converter to operate in parallel to send power to the rotor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Figure 1:
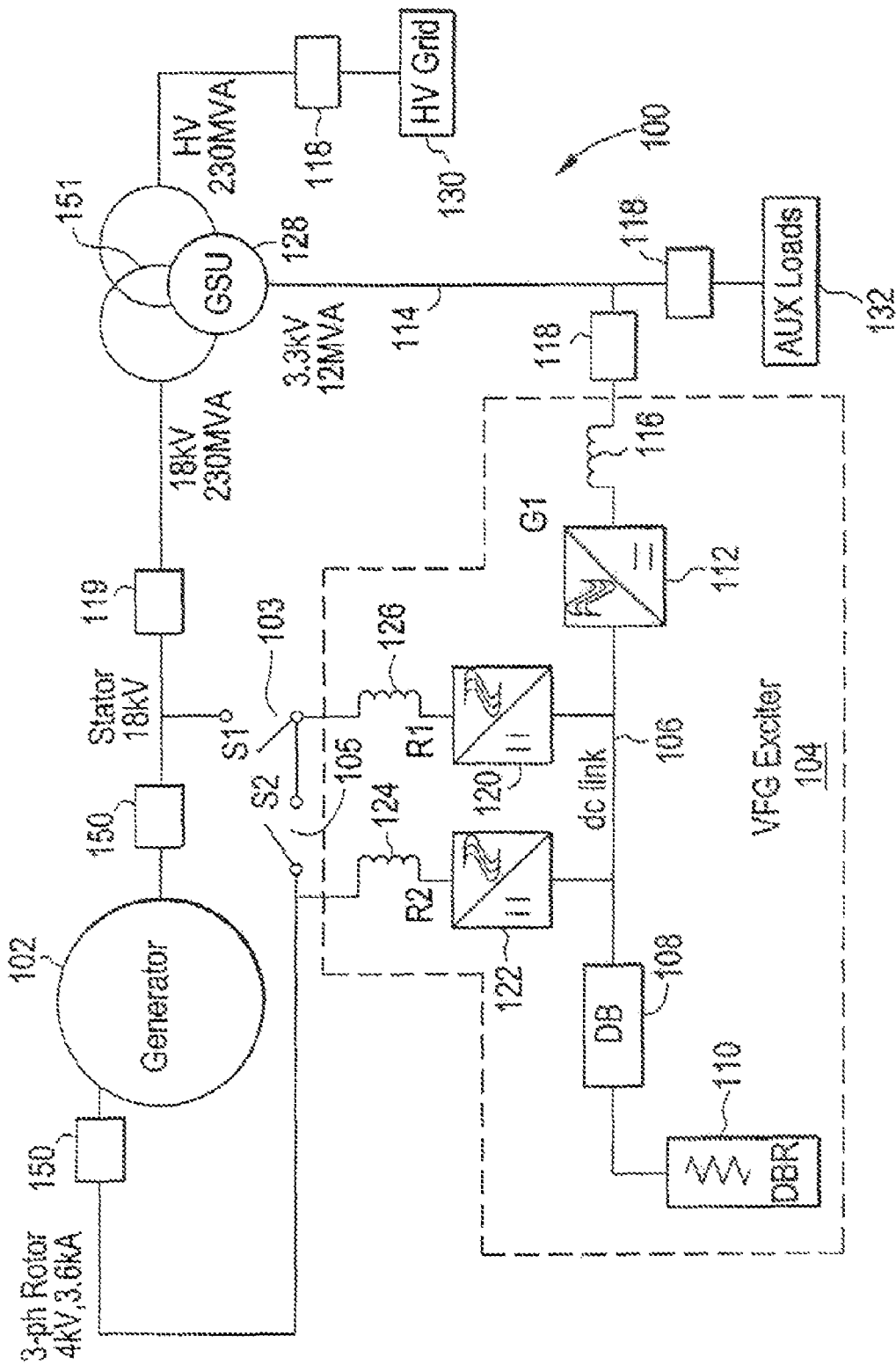
FIG. 1 is a diagram of an exemplary system for a generator having a three phase rotor.

In this regard, referring to FIG. 1, the system 100 includes a generator 102. In the illustrated exemplary embodiment, generator 102 is a gas turbine generator with a three phase rotor (not shown) rated for 4 kV, 3.6 kA and a stator (not shown) rated for 18 kV, however the generator 102 may be rated for other loads as needed by design or may be another type of generator, such as, for example a turbine, or a diesel generator. In the illustrated embodiment, the generator 102 includes 3 slip rings. The generator 102 rotor and stator are connected to a variable frequency generator (VFG) exciter 104 via a first switch (S1) 103 and a second switch (S2) 105.

The VFG exciter 104 is a 3.3 kV exciter, and includes a DC link 106. A dynamic brake 108 connected to a dynamic brake resistor 110 may be coupled to the DC link 106. A converter (G1) 112 is connected to the DC link 106 and a 3 kV source 114 via an inductor 116 and a breaker 118. The VFG exciter 104 also includes a first converter (R1) 120 and a second converter (R2) 122 each connected to the DC link 106. R2 is also connected to the generator 102 rotor. R1 120 is connected to S1 103 and S2 105 such that when S1 is closed R1 120 is connected in parallel with R2 122 to the generator 102 rotor. When S2 105 is closed and S1 103 is open, R1 120 is connected to the generator 102 stator. An inductor 124 may be disposed between R2 122 and the generator 102 rotor, and an inductor 126 may be disposed between R1 120 and S1 103 and S2 105.

In the illustrated exemplary embodiment, the power output of the generator 102 stator is connected via a breaker 119 to a tertiary winding on the generator step-up unit (GSU) 128. The GSU outputs power to the 3.3 kV source 114 and a high voltage (HV) grid 130. Breakers 118 may be disposed between the HV grid 130 and auxiliary loads 132. Auxiliary loads 132 may include, for example, fuel pumps, actuators, and power for generator 102 control systems.

Modes of operation of the system 100 include running and starting. In running operation, the VFG exciter 104 receives AC power from the 3.3 kV source 114 via the breaker 118. G1 112 receives the AC power via the inductor 116 and converts the AC power to DC power to power the DC link 106. The G1 112 may also transform the AC voltage of the 3.3 kV source 114 to an appropriate voltage prior to converting the AC power to DC power.

R1 120 and R2 122 receive the DC power from the DC link 106 and convert the DC power to AC power (4 kV, 3.6 kA) for the generator 102 rotor. While in running operation, S1 103 is open and S2 105 is closed. Thus, R1 120 and R2 122 connect in parallel to the generator 102 rotor via inductors 126 and 124.

The generator 102 outputs AC power via a generator breaker 119 to the GSU 128 for voltage conversion. In the illustrated embodiment, the GSU 128 includes a tertiary winding 151. The GSU converts the output voltage (18 kV) of the generator 102 to the appropriate voltages for the 3.3 kV source 114 and the HV grid 130. In the illustrated example, the GSU 128 sends 3.3 kV, 12 MVA to the 3.3 kV source 114 and 230 MVA to the HV grid 130. Breakers 118 may be disposed between the HV grid 130 and the auxiliary loads 132. Harmonic filters 150 may be included on the 3.3 kV source 114 and the generator 102 rotor.

The use of a tertiary winding 151 in the illustrated exemplary embodiment minimizes the equipment connected to the output of the generator 102. Other embodiments may include a separate transformer connected to the generator 102 output. Thus, the configuration of the GSU may be dependent on the application of the system 100.

The breakers 118 are provided as an exemplary embodiment of the system 100 and may be located in alternate locations, or not included in the system 100 as appropriate, dependant on the application of the system 100. The illustrated embodiment also includes the dynamic brake 108 and the dynamic brake resistor 110 attached to the DC link 106. The dynamic brake 108 may optimally be included to protect the exciter during grid faults.

In starting operation, the generator 102 stator receives power (torque current) to turn the generator 102 from the VFG exciter 104. The generator 102 rotor also receives power from the VFG exciter 104. The turning of the generator 102 rotates the generator 102 prime mover (not shown). Once the prime mover is rotating at an appropriate speed, the starting mode may end and the system may be switched to the running condition described above so the generator 102 begins to generate power.

In this regard, while in starting operation, the generator breaker 119 is open, S1 103 is closed, and S2 105 is open. Thus, VFG exciter 104 provides power to the generator 102 stator via R1 120, and also provides power to the generator 102 rotor via R2 122. Once the generator 102 prime mover has started, the power to the generator 102 stator is no longer needed, and the system 100 transitions into running operation. Thus, R1 120 is blocked, S1 103 opens and S2 105 closes placing R1 120 and R2 122 in parallel. The VFG exciter 104 nulls the voltage across the generator breaker 119 independent of speed (within slip range), and the generator breaker may be closed to provide power to the HV grid 130.

In running operation, when the generator 102 is subjected to a load from the HV grid 130, the generator 102 rotor receives power from both R1 120 and R2 122, however in starting operation, the load on generator 102 is lower. Therefore, the generator 102 may start using R1 120 to provide power to the generator 102 rotor and utilize R2 122 for powering the generator 102 stator. Thus, system 100 conserves the number of converters needed for starting operations and running operations of the generator 102.

Figure 2:
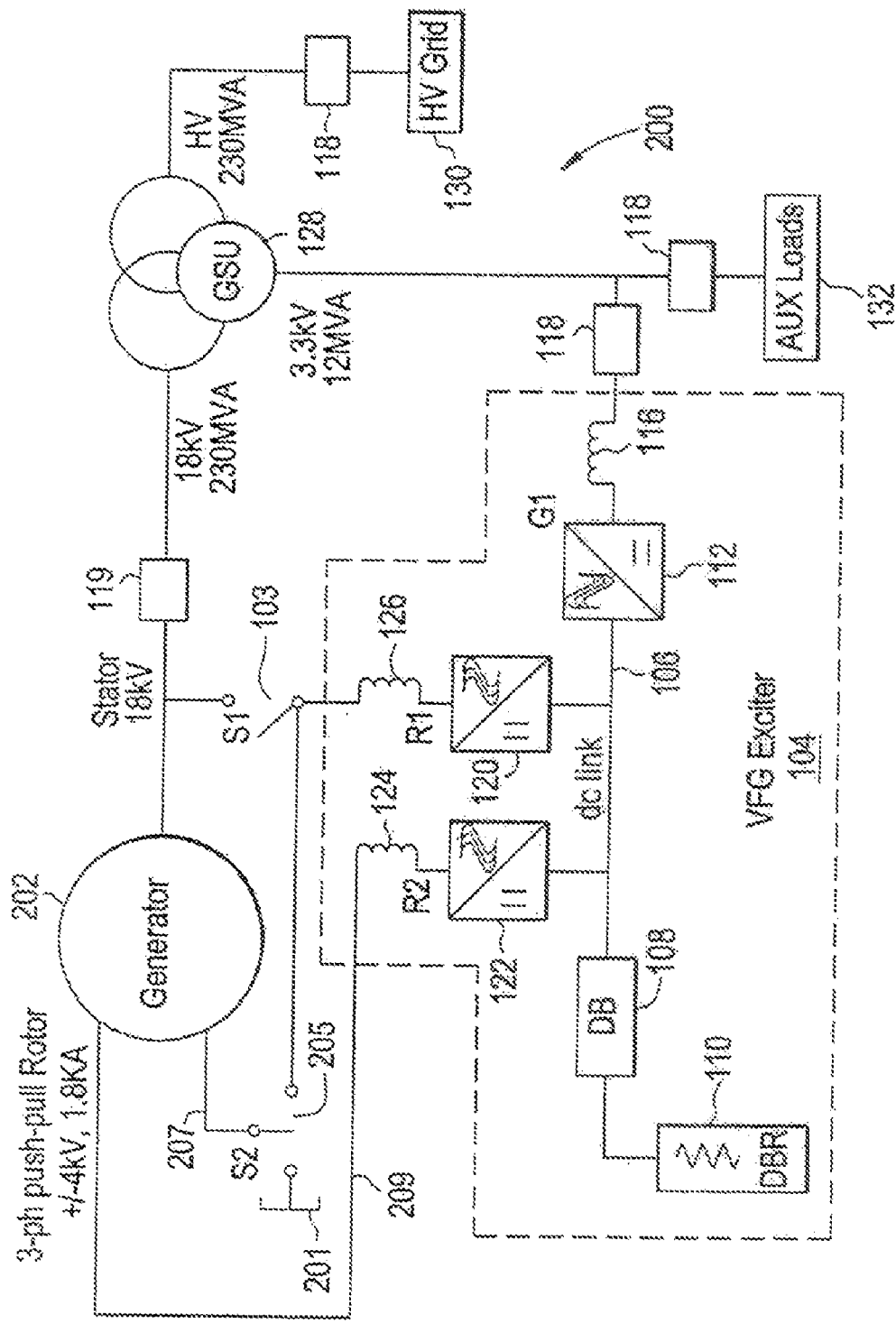
FIG. 2 is a diagram of an exemplary system for a generator having a three phase push-pull rotor.

An alternate embodiment of a VFG system is illustrated in FIG. 2. In this regard, FIG. 2 shows a system 200. The system 200 is similar to the system 100 illustrated in FIG. 1, however system 200 includes a generator 202 that includes a three phase push-pull rotor (not shown) rated for +/−4 kV, 1.8 kA. The generator 202 rotor includes three windings each connected to a separate slip ring.

The converters R1 120 and R2 122 are configured in a push-pull arrangement. R2 122 is connected to the +4 kV input 209 of the generator 202 rotor. R1 120 is connected via S1 103 to the generator 202 stator. R1 120 is also connected to the −4 KV input 207 of the generator 202 rotor via a second switch (S2) 205. S2 205 may also switch to ground 201 thereby connecting the −4 KV input 207 to the ground 201.

System 200 operates in a running operation and a starting operation similar to system 100. In running operation, R2 122 provides +4 kV to the +4 KV input 209 of the generator 202 rotor. S1 103 is open and S2 205 is closed in a position such that R1 120 provides −4 kV to the −4 KV input 207 of the generator 202 rotor.

In starting operation, R2 122 provides +4 kV to the +4 KV input 209 of the generator 202 rotor. S1 103 is closed such that the VFG exciter 104 provides power to the generator 202 stator (not shown) via R1 120. S2 205 is closed in a position such that the −4 KV input 207 of the generator 202 rotor is connected to the ground 201. Thus, −4 KV windings 207 of the generator 202 rotor have effectively 0V.

System 200 uses half of the rotor windings during the starting operation, thus the torque available for starting the prime mover (not shown) is effectively half of the torque available in system 100. However, one advantage of the system 200 is that the push-pull arrangement allows operation of the generator at full load with one of the two converters (R1 120 and R2 122) disabled, thereby increasing the reliability of the system 200.

Figure 3:
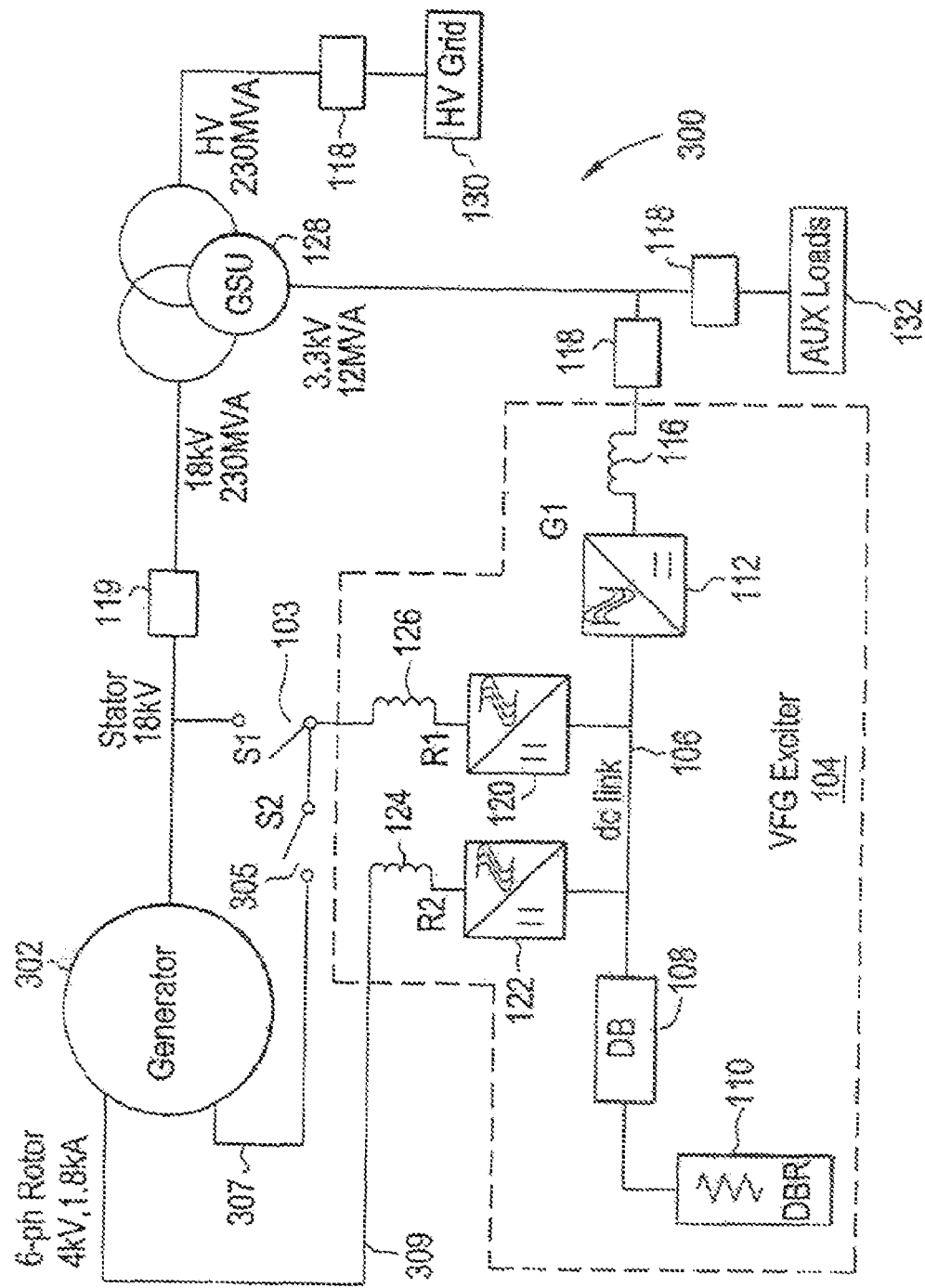
FIG. 3 is a diagram of an exemplary system for a generator having a six phase rotor.

FIG. 3 illustrates another alternate exemplary embodiment of a VFG system. In this regard, system 300 is similar to the other illustrated embodiments, but includes a generator 302 having a six phase rotor (not shown). In the illustrated configuration the generator 302 rotor has two sets of three phase windings (not shown). A first set of three phase windings is connected to an input 309 of the generator 203 rotor, while a second set of three phase windings is connected to an input 307 of the generator 302 rotor.

System 300 operates in a running operation and a starting operation similar to system 100. In the running operation, R2 122 provides a first three phases of 4 KV to the input 309 of the generator 302 rotor. S1 103 is open and S2 305 is closed in a position such that R1 120 provides a second three phases of 4 kV to the input 307 of the generator 302 rotor.

In starting operation, R2 122 provides the first three phases of 4 KV to the input 309 of the generator 302 rotor. S1 103 is closed such that the VFG exciter 104 provides the second three phases of 4 KV to the generator 302 stator via R1 120. S2 is open such that the input 307 of the generator 202 rotor receives effectively 0V from R1 120.

Other alternate embodiments of system 3 may include a generator 302 with more than six phases on the rotor. In such a configuration, additional converters and switches may be required to meet design considerations.

Other alternate embodiments of the illustrated embodiments described above, may use generators of different ratings. These generators may require alternate numbers of converters in the VFG exciters. For example, R1 120 and R2 122 may include a plurality of converters in parallel. Regardless of the rating dependent configuration of the VFG exciter 104, S1 103 and S2 105 that transition between starting operations and running operations may be configured in a similar manner.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An electrical generation system comprising:
    a generator, wherein the generator includes:
        a stator portion; and
        a rotor portion;
    a variable frequency generator (VFG) exciter, wherein the VFG exciter includes:
        a first converter, operative to convert DC current to AC current connected to a DC link; and
        a second converter, operative to convert DC current to AC current connected to the DC link;
    a first switch operative, when closed, to connect the first converter to the stator portion while the generator is operating in a starting condition, wherein the first switch is open while the generator is operating in a running condition; and
    a second switch operative, when closed, to connect the first converter and the second converter in parallel, to the rotor portion while the generator is operating in the running condition, wherein the second switch is open while the generator is operating in the starting condition.

2. The electrical generation system of claim 1, wherein the VFG exciter further comprises a third converter operative receive an AC current from an AC source, convert the AC to a DC current, and send the DC current to the DC link.

3. The electrical generation system of claim 2, wherein the third converter is further operative to transform a first AC voltage from the AC source to a second AC voltage.

4. The electrical generation system of claim 1, wherein the VFG exciter further comprises:
    a dynamic brake and a dynamic brake resistor, operative to protect the exciter during a grid fault.

5. The electrical generation system of claim 1, wherein the first switch and the second switch are located in the VFG exciter.

6. The electrical generation system of claim 1, further comprising harmonic filters connected to the rotor.

7. The electrical generation system of claim 1, further comprising a tertiary winding on a generator step up portion, wherein the tertiary winding is operative to receive an output power from the stator portion, transform the output power voltage, and send the output power to a power grid.

8. The electrical generation system of claim 7, wherein the tertiary winding is further operative to send a second output power to a second voltage output.

9. The electrical generation system of claim 8, further comprising harmonic filters connected to the second voltage output.

10. The electrical generation system of claim 2, wherein the AC source is a second voltage output.

11. The electrical generation system of claim 2, wherein the AC source is a power grid.

12. The electrical generation system of claim 1, further comprising a gas turbine generator.

13. A variable frequency generator (VFG) exciter comprising:
    a first converter, operative to convert DC current to AC current connected to a DC link; and
    a second converter, operative to convert DC current to AC current connected to the DC link, wherein the second converter is electrically connected to a generator rotor;
    a first switch operative, when closed, to connect the first converter to a stator portion while a generator is operating in a starting condition, wherein the first switch is open while the generator is operating in a running condition; and
    a second switch operative, when closed, to connect the first converter and the second converter in parallel, to the rotor portion while the generator is operating in a running condition, wherein the second switch is open while the generator is operating in the starting condition.

14. A method for starting and operating a VFG system, the method comprising:
    closing a first switch, wherein the closed first switch is operative to connect a first converter to a stator of a generator;
    starting the first converter, wherein the first converter is operative to convert DC power to AC power and control the stator;
    starting a second converter, wherein the second converter is electrically connected to a rotor, and is operative to convert DC power to AC power and control the rotor;
    starting a generator;
    opening the first switch, thereby disconnected the first converter from the stator;
    closing a second switch, wherein closing the second switch connects the first converter and the second converter in parallel; and
    controlling the first converter and the second converter to operate in parallel to send power to the rotor.

* * * * *